(12) United States Patent
Haverda (10) Patent No.: US 12,485,433 B2
(45) Date of Patent: Dec. 2, 2025

(54) ABRASIVE BLASTING NOISE REDUCTION NOZZLE AND SHROUD

(71) Applicant: Gary C. Haverda, San Antonio, TX (US)

(72) Inventor: Gary C. Haverda, San Antonio, TX (US)

(*) Notice: Subject to any disclaimer, the term of this patent is extended or adjusted under 35 U.S.C. 154(b) by 371 days.

(21) Appl. No.: 18/203,181

(22) Filed: May 30, 2023

(65) Prior Publication Data

US 2023/0415172 A1 Dec. 28, 2023

Related U.S. Application Data (63) Continuation-in-part of application No. 16/590,117, filed on Oct. 1, 2019, now Pat. No. 11,660,725.

(60) Provisional application No. 62/869,437, filed on Jul. 1, 2019.

(51) Int. Cl.
    *B05B 1/00* (2006.01)
    *B05B 7/14* (2006.01)
    *B24C 5/04* (2006.01)

(52) U.S. Cl.
    CPC ............ *B05B 1/002* (2018.08); *B05B 7/1486* (2013.01); *B24C 5/04* (2013.01)

(58) Field of Classification Search
    CPC ... B24C 7/0007; B24C 7/0038; B24C 7/0046; B24C 7/0076; B24C 7/0084; B24C 5/02; B24C 5/04; B05B 1/002; B05B 7/1486
    See application file for complete search history.

(56) References Cited

U.S. PATENT DOCUMENTS

| | | | |
|---|---|---|---|
| 1,811,762 A | 6/1931 | Schnell | |
| 3,602,333 A | 8/1971 | Kobayashi et al. | |
| 3,628,627 A | * 12/1971 | Arnold | B24C 5/02 |
| | | | 181/255 |
| 3,960,239 A | 6/1976 | Frochaux et al. | |
| 3,982,605 A | * 9/1976 | Sneckenberger | B05B 1/005 |
| | | | 239/DIG. 21 |
| 4,113,051 A | 9/1978 | Moller | |
| 4,228,868 A | 10/1980 | Raczuk | |
| 4,534,139 A | 8/1985 | Desjardins | |

(Continued)

FOREIGN PATENT DOCUMENTS

CA 2616403 A1 6/2009

*Primary Examiner* — Joel D Crandall
(74) *Attorney, Agent, or Firm* — Kammer Browning PLLC; Mark A. Kammer (57) ABSTRACT

A shroud assembly fixed to an abrasive blasting nozzle provides acoustic dampening during operation of the blasting system to reduce damage to the hearing of the user. The shroud assembly additionally provides features that improve safety and reduce fatigue during use. A first embodiment includes an end closure made up of flat acoustic panels and an alternate embodiment includes an end opening having peripheral chevron shaped acoustic panel edges. The shroud assembly includes a mechanism for attachment of the shroud to the abrasive blasting nozzle, a cylindrical blast column positioned forward from and coaxial with the blast nozzle, a cylindrical cone shell with at least one layer of acoustic dampening material surrounding and coaxial with the cylindrical blast column, a dead man switch handle, a second extended handle, a peripheral air curtain generator at the forward opening, and nested layers of one or more types of acoustic material(s).

10 Claims, 7 Drawing Sheets

(56) References Cited

U.S. PATENT DOCUMENTS

| | | | |
|---|---|---|---|
| 4,993,200 | A | 2/1991 | Morioka et al. |
| 5,365,702 | A | 11/1994 | Shank, Jr. |
| 5,704,825 | A | 1/1998 | LeCompte |
| 5,795,626 | A | 8/1998 | Gabel et al. |
| 5,810,566 | A | 9/1998 | Pauwels |
| 5,947,800 | A | 9/1999 | Fring |
| 6,036,584 | A | 3/2000 | Swinkels et al. |
| 6,112,850 | A * | 9/2000 | Secrest ............... F04D 29/663 454/906 |
| 6,390,898 | B1 | 5/2002 | Pieper |
| 6,626,738 | B1 | 9/2003 | Shank |
| 7,074,117 | B2 | 7/2006 | Dore |
| 7,101,266 | B2 | 9/2006 | Grechishkin |
| 7,520,124 | B2 | 4/2009 | Narayanan et al. |
| 8,256,569 | B1 | 9/2012 | Huff et al. |
| 8,801,499 | B2 | 8/2014 | Yoshizawa et al. |
| 10,076,823 | B2 | 9/2018 | Eliason et al. |
| 10,150,203 | B1 | 12/2018 | Sullivan et al. |
| 2006/0063476 | A1 | 3/2006 | Dore |
| 2011/0306279 | A1 | 12/2011 | Hunziker |
| 2012/0301643 | A1 | 11/2012 | Aadland et al. |
| 2019/0001465 | A1 | 1/2019 | Adar |
| 2020/0282517 | A1* | 9/2020 | Sullivan ............... B24C 3/02 |

\* cited by examiner

ABRASIVE BLASTING NOISE REDUCTION NOZZLE AND SHROUD

CROSS REFERENCES TO RELATED APPLICATIONS

This Application claims the benefit under Title 35 United States Code § 120 as a Continuation-in-Part of co-pending U.S. patent application Ser. No. 16/590,117, filed Oct. 1, 2019, which claims the benefit under Title 35 United States Code § 119(e) of U.S. Provisional Patent Application Ser. No. 62/869,437; Filed: Jul. 1, 2019; the full disclosures of which are incorporated herein by reference.

BACKGROUND OF THE INVENTION

1. Field of the Invention

The present invention relates generally to abrasive blasting systems. The present invention relates more specifically to devices for reducing noise and user fatigue associated with the operation of an abrasive blasting system.

2. Description of the Related Art

Various types of wet and dry abrasive blasting systems are known in the art. Most such systems use standard components terminating in nozzles with a variety of apertures, depending on the object being blasted and the type of abrasive being used. Whatever the system and material, the high pressure air flows with entrained abrasive particles generate significant forces and acoustic waves, both of which can have severe detrimental effects on the user/operator of such systems.

Efforts have been made to improve the efficiency of the blasting process, balancing the force required to effectively do the job with the ability of the operator to safely and securely hold and manipulate the blasting nozzle over a period of time. Despite such efforts, efficiency is often achieved at the cost of safety and safety can often only be achieved with reduced efficiency. There are, in addition, long term safety issues, such as hearing loss and musculoskeletal vibration injuries, that must be considered apart from the immediate safety issues associated with direct injury to the muscles, tendons, skin, ears, and eyes of the user/operator. Efficiency with abrasive blasting systems must also take into consideration how fast the operator can move across a surface and how long the user/operator can work the surface before requiring some rest. Other factors that affect efficiency include the type of surface being worked, the type of abrasive being used, and the pressure at which the system is operating. Most existing abrasive blasting systems sacrifice long-term and short-term safety for the immediate concerns of operational efficiency.

It would be desirable to have an abrasive blasting system that provided a safer working environment without dramatically reducing operational efficiency. It would be desirable to have a system that reduced the likelihood of direct contact between the abrasive stream and the operator without significantly reducing the ability of the operator to easily handle and manipulate the nozzle of the system. It would be desirable to have a system that reduced the noise generated by the typical abrasive blasting nozzle without significantly reducing the force provided by the abrasive stream or the ability of the operator to accurately direct the abrasive stream. It would be desirable to have a system that also reduced noise and improved safety for the benefit of bystanders. It would be beneficial if such an improved abrasive blasting system did not significantly increase the cost of the overall system or significantly alter the manner of using the overall system. That is, it would be desirable if such improvements could be easily implemented in connection with most standard abrasive blasting systems currently in use.

SUMMARY OF THE INVENTION

In fulfillment of the above and further objectives the present invention provides a shroud that may be affixed to an abrasive blasting nozzle to create a limited physical barrier to protect the user/operator and acoustic dampening components to reduce damage to the hearing of the operator. The device additionally provides a variety of features that improve safety and reduce fatigue during the use and operation of the abrasive blasting system. A preferred embodiment includes a partial end closure made up of flat acoustic panels is described as well as an alternate embodiment with an end opening having peripheral chevron shaped acoustic panel edges. The system includes a mechanism for attachment of the shroud to the abrasive blasting nozzle, a dead man switch handle, a second extended handle, a peripheral air envelope generator at the forward opening, and nested layers of one or more types of acoustic material(s). The shroud may be coupled to standard abrasive blasting nozzles or may include a built-in nozzle attachable to a standard abrasive blasting whip hose. The shroud system has connectors for operation of the incorporated dead man switch and may use an optional belt and/or shoulder harness to assist with the handling of the shroud and nozzle. While the system of the present invention is directed primarily to dry abrasive streams, the structures and principles involved can be applied to wet abrasive streams with minimal modifications.

DETAILED DESCRIPTION OF THE EXEMPLARY EMBODIMENTS

Figure 1:
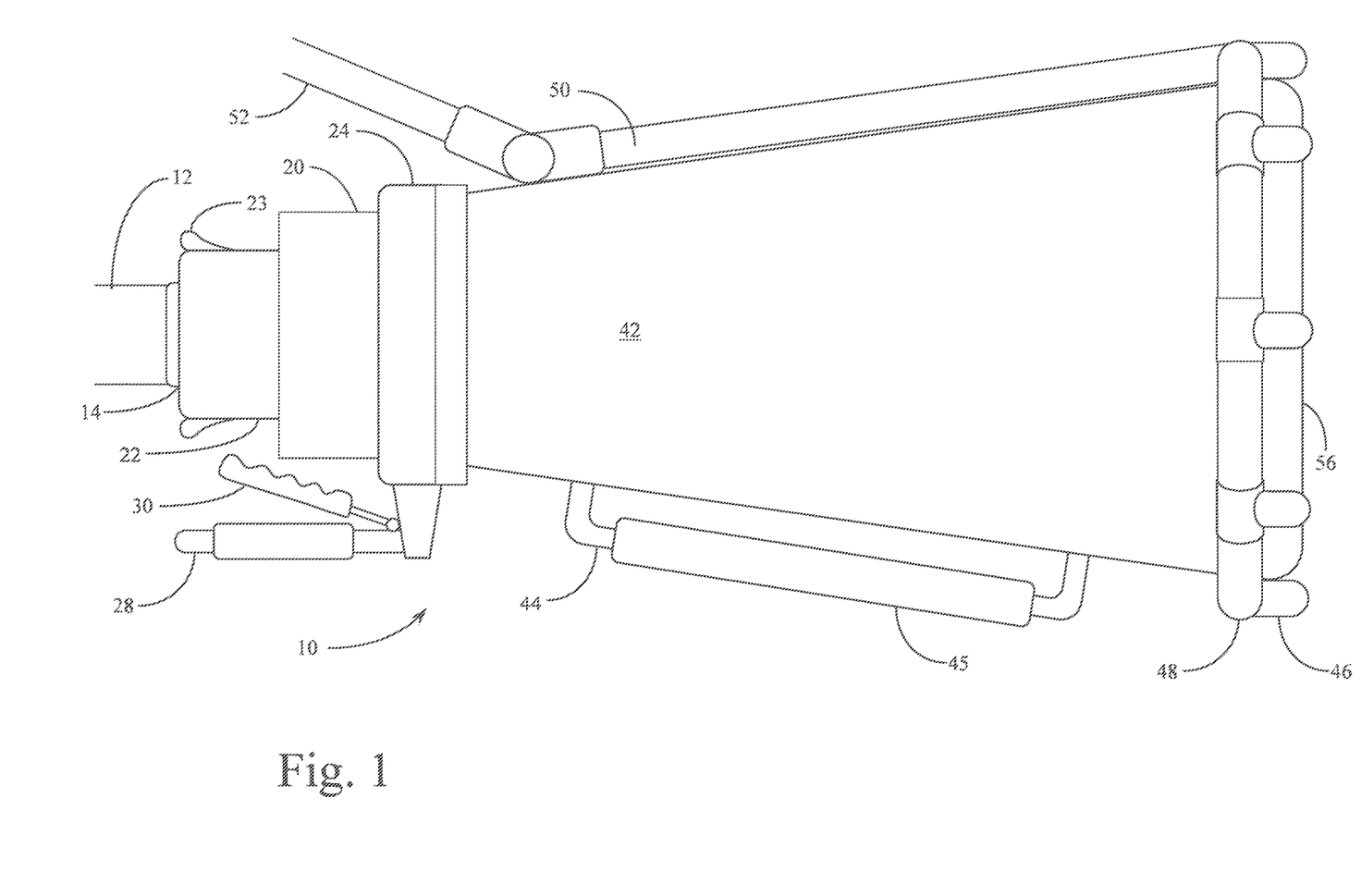
FIG. 1 is a side elevations view of a first preferred embodiment of the nozzle shroud and safety device of the present invention showing the exterior enclosure and external structures of the device.

Reference is made first to FIG. 1 which is a side elevational view of a first preferred embodiment of the nozzle shroud and safety device of the present invention showing the exterior enclosure and external structures of the device. In FIG. 1, nozzle shroud assembly 10 is shown connected to blasting material supply hose (whip hose) 12 through hose nozzle coupler 14 which connects to shroud nozzle attachment collar 20 by way of shroud collar hose threaded attachment 22. In the preferred embodiment, the blasting nozzle (not seen in FIG. 1) which terminates nozzle coupler 14, is secured to the shroud of the present invention using threaded attachment hand tightening fins 23 positioned on threaded attachment 22 which rotates captively on attachment collar 20.

Figure 2:
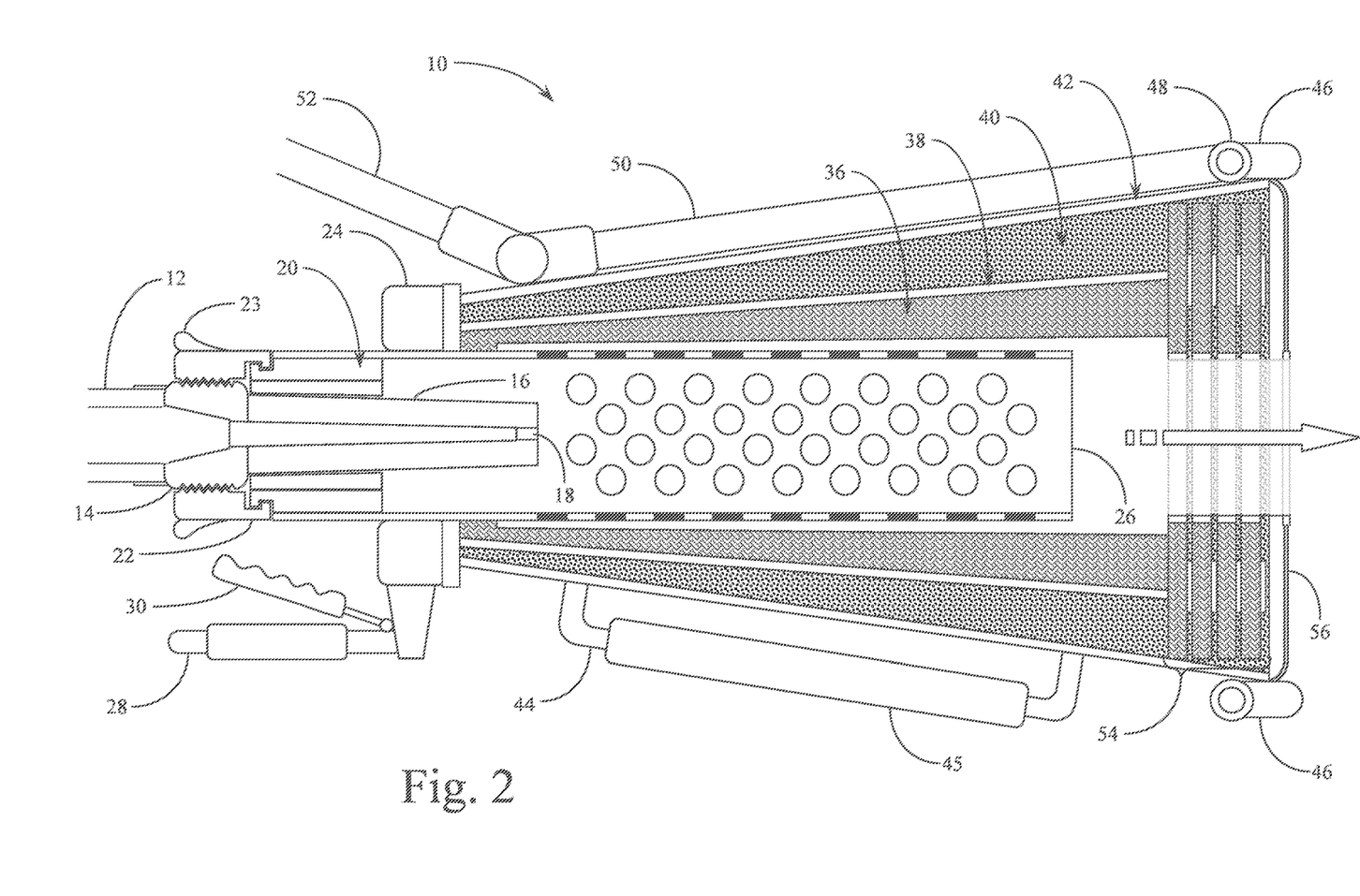
FIG. 2 is a cross-sectional view of the first preferred embodiment of the nozzle shroud and safety device of the present invention disclosed in FIG. 1 and taken on Section Line A-A' in FIG. 3 and showing the interior layers of noise reduction materials and structures.

Shroud cone collar 24 is fixed on attachment collar 20 and supports outer cone shell 42 which forms the overall enclosure for the noise dampening structures of the present invention (see FIG. 2). The dimensions of the outer cone shell 42, and therefore of the internal structures of the device, are primarily determined relative to the size of the blast nozzle. The length of the shroud is preferably about two to four times the length of the typical constrictive blast nozzle of the type shown in FIG. 2. Other nozzle dimensions, such as the nozzle orifice diameter, can be a factor in optimizing the length of the shroud. It has been found, for example, that a shroud length (measured from the end of the nozzle) of at least thirty-two times the diameter of the orifice nozzle, can appropriately balance the safety and efficiency objectives of the present invention. The width and taper of the outer cone shell 42 are also dependent upon the size of the blast nozzle and are limited by the need of the operator to view the work area where the abrasive stream is directed.

The nozzle shroud assembly 10 is preferably held by the operator using two hands with one hand holding rear control handle (anti-vibration) 28, and a second hand holding forward grip handle 44 with anti-vibration grip cushion 45. Rear control handle 28 operates with dead man switch 30 which is a standard electrical or pneumatic safety switch that cuts the blast stream off if the operator lets go of the device or the switch. The manner in which the operator holds and manipulates the device of the present invention is seen more clearly in FIG. 5.

An optional, but preferable, ancillary air curtain system is incorporated on the exterior of the shroud to provide a cylindrical air curtain around the exit port of the device. Peripheral air curtain nozzles 46 are positioned peripherally around the forward edge of the device and direct jets of air (without entrained particles) forward to surround the outlet and to provide additional noise dampening. Peripheral air curtain distribution hose 48 is secured to the forward rim of outer cone shell 42 and supports the array of nozzles 46. Peripheral air curtain supply conduit 50 is fixed to the side of outer cone shell 42 and directs a flow of pressurized air to distribution hose 48 from peripheral air curtain supply hose 52. Pressurized air for this ancillary air curtain system is preferably supplied by the same air compressor system (see FIG. 5) as supplies the abrasive blasting air, albeit at a regulated reduced pressure and flow. The objective of the air curtain is not to add to the forward force exerted by the blast nozzle but rather to create a cylindrical "soft extension" of the shroud that facilitates the retention of the sound waves within the cone created. Further, the air curtain can assist with the containment of dust generated during the blasting process.

In the first preferred embodiment of the present invention, outer cone shell 42 is closed on the rearward end by the connection to the whip hose 12 terminating in the blast nozzle (see FIG. 2). Outer cone shell 42 is partially closed on the forward end of the device by forward shroud cover 56. A central opening (see FIG. 2) allows for the unimpeded passage of the abrasive blast stream through to the surface being worked. Again, the internal and external components of nozzle shroud assembly 10 are not meant to impede the blast stream, but rather to capture and reduce the acoustic waves that expand outward from the blast nozzle when the high-pressure air flow (with entrained particles) exits the nozzle.

Reference is next made to FIG. 2 which is a partial cross-sectional view of the first preferred embodiment of the nozzle shroud and safety device of the present invention showing the interior layers of noise reduction materials and structures. Once again, the cross-sectional view of FIG. 2 is that taken along Section Line A-A' shown in FIG. 3. The views of FIGS. 2 & 4 therefore provide the best descriptions of the improvements that constitute the present invention.

In FIG. 2, nozzle shroud assembly 10 is again shown connected to whip hose 12 through hose nozzle coupler 14 which connects to shroud nozzle attachment collar 20 by way of shroud collar hose threaded attachment 22. In the preferred embodiment, blasting nozzle 16, which terminates nozzle coupler 14, is secured to the shroud of the present invention using threaded attachment hand tightening fins 23 positioned on threaded attachment 22 which, as more clearly seen in FIG. 2, rotates captively on attachment collar 20. In this manner, nozzle 16 at the end of whip hose 12 is tightly secured into the receptacle collar components at the rearward end of shroud assembly 10. Once again, shroud cone collar 24 is fixed on attachment collar 20 and supports outer cone shell 42 which forms the overall enclosure for the noise dampening structures of the present invention.

Blasting nozzle 16 presents its nozzle outlet port 18 in the axial center of metal mesh blast column 26. Mesh blast column 26 is the forward extension of shroud nozzle attachment collar 20 and is preferably constructed of a rigid metal cylinder perforated with an array of apertures as shown. These apertures provide the initial disruption of the acoustic waves coming off nozzle outlet port 18. Surrounding mesh blast column 26, but preferably spaced therefrom, is inner acoustic dampener material 36. In the preferred embodiment, inner acoustic dampener material 36 is constructed from open cell dimensional acoustic foam. This second layer of acoustic wave disruption is not intended to provide a barrier to the acoustic waves as much as it serves to further attenuate the waves and disperse their energy.

Intermediate air gap 38 separates inner acoustic dampener material 36 from the next noise reduction layer made up of outer acoustic dampener material 40. In the preferred embodiment, outer acoustic dampener material 40 is constructed from a layer of dense acoustic panel that in turn provides further attenuation of the expanding acoustic waves. Outer acoustic dampener material 40, while still not impermeable, does provide a dense fibrous material of the type used for acoustic panels and the like. This outer acoustic material is confined and shaped by outer cone shell 42, which does provide the final side barrier to the expanding acoustic waves generated by the abrasive blast emanating from the blast nozzle.

Although the path immediately forward from the blast nozzle 16 through mesh blast column 26 is clear through forward shroud cover 56, the peripheral volume associated with the concentric layers of acoustic material are capped with forward acoustic material layered baffle 54 as shown in FIG. 2. With from one to six or more layers, preferably made up of the same dense acoustic material as outer acoustic dampener material 40, the layered baffle 54 provides yet another material into which the expanding acoustic waves are captured and attenuated. The most effective arrangement for this layered baffle 54 is as an array of donut shaped disks with spacers establishing air gaps between the layers of dense acoustic panels. Not until the acoustic waves (now well attenuated) encounter the forward shroud cover 56 do they hit a rigid structure (as with outer cone shell 42) that tends to reflect the waves back rather than attenuate them further. While some acoustic waves still escape the system through the axial opening that allows the unimpeded passage of the abrasive blast stream, significant reductions in the acoustic energy generated at the abrasive nozzle are achieved by the multi-layer, multi-material structures provided by the present invention.

Figure 3:
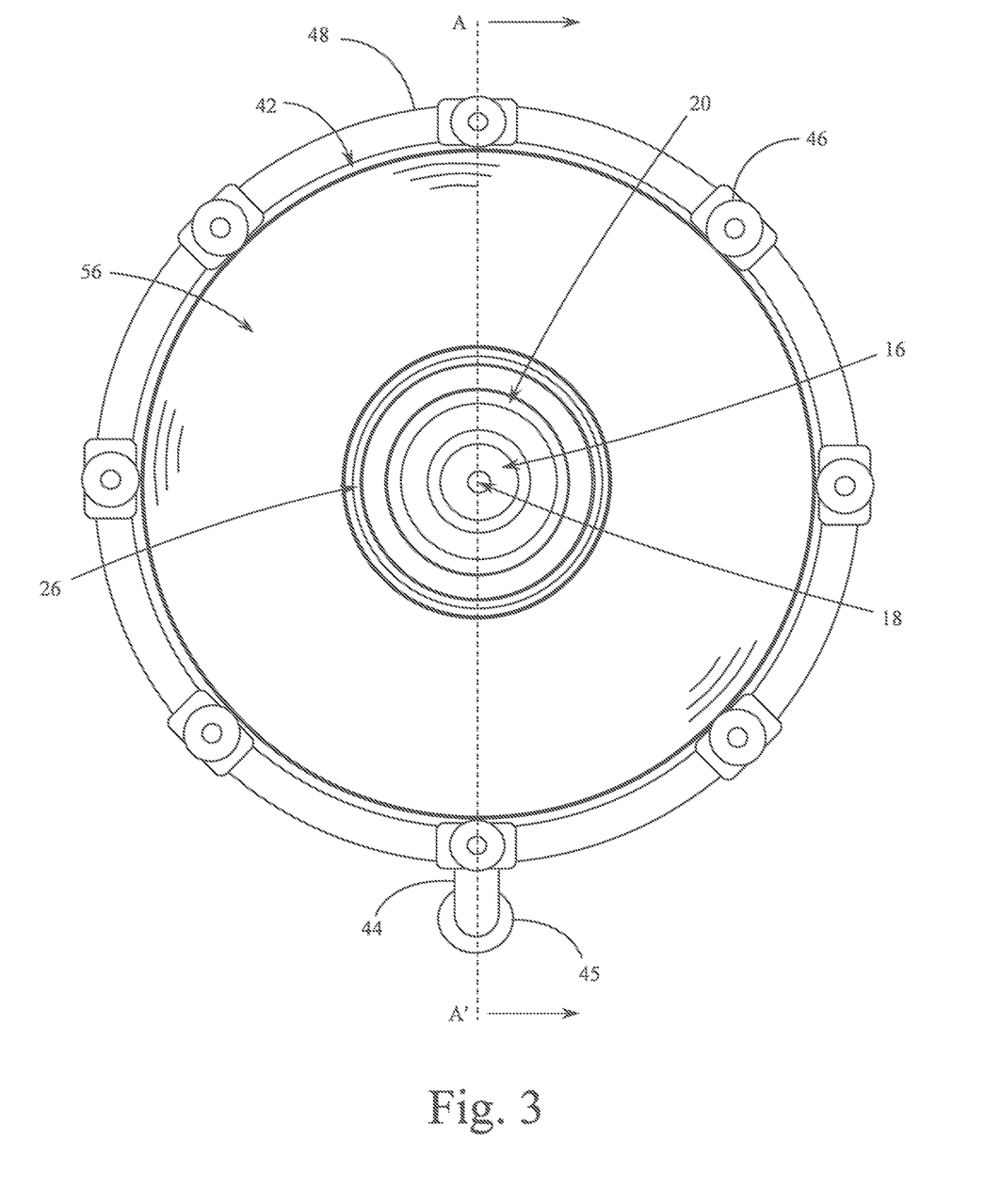
FIG. 3 is a front elevational view of the preferred embodiment of the nozzle shroud and safety device of the present invention as shown in FIG. 1 with the front cover in place, showing the central abrasive blasting outlet aperture.

Reference is next made to FIG. 3 for a front elevational view of the preferred embodiment of the nozzle shroud and safety device of the present invention as shown in FIG. 1 with the front cover in place, showing the central abrasive blasting outlet aperture. As indicated above, Section Line A-A' in FIG. 3 identifies the cross-section view shown in FIG. 2.

In the view of FIG. 3, blasting nozzle 16 presents its nozzle outlet port 18 in the axial center of metal mesh blast column 26. Once again, mesh blast column 26 is the forward extension of shroud nozzle attachment collar 20. These components are viewed through the central aperture in forward shroud cover 56 which extends to the peripheral edge of outer cone shell 42. The ancillary air curtain system, described above, is shown incorporated on the exterior of the shroud to provide the cylindrical air curtain around the exit port of the device. Peripheral air curtain nozzles 46 (eight in the embodiment shown) are radially arrayed on peripheral air curtain distribution hose 48 that is secured to the forward rim of outer cone shell 42. The forward end of forward grip handle 44 with anti-vibration grip cushion 45 is also seen in the view of FIG. 3 although its point of attachment to outer cone shell 42 is hidden behind one of the peripheral air curtain nozzles 46.

Figure 4:
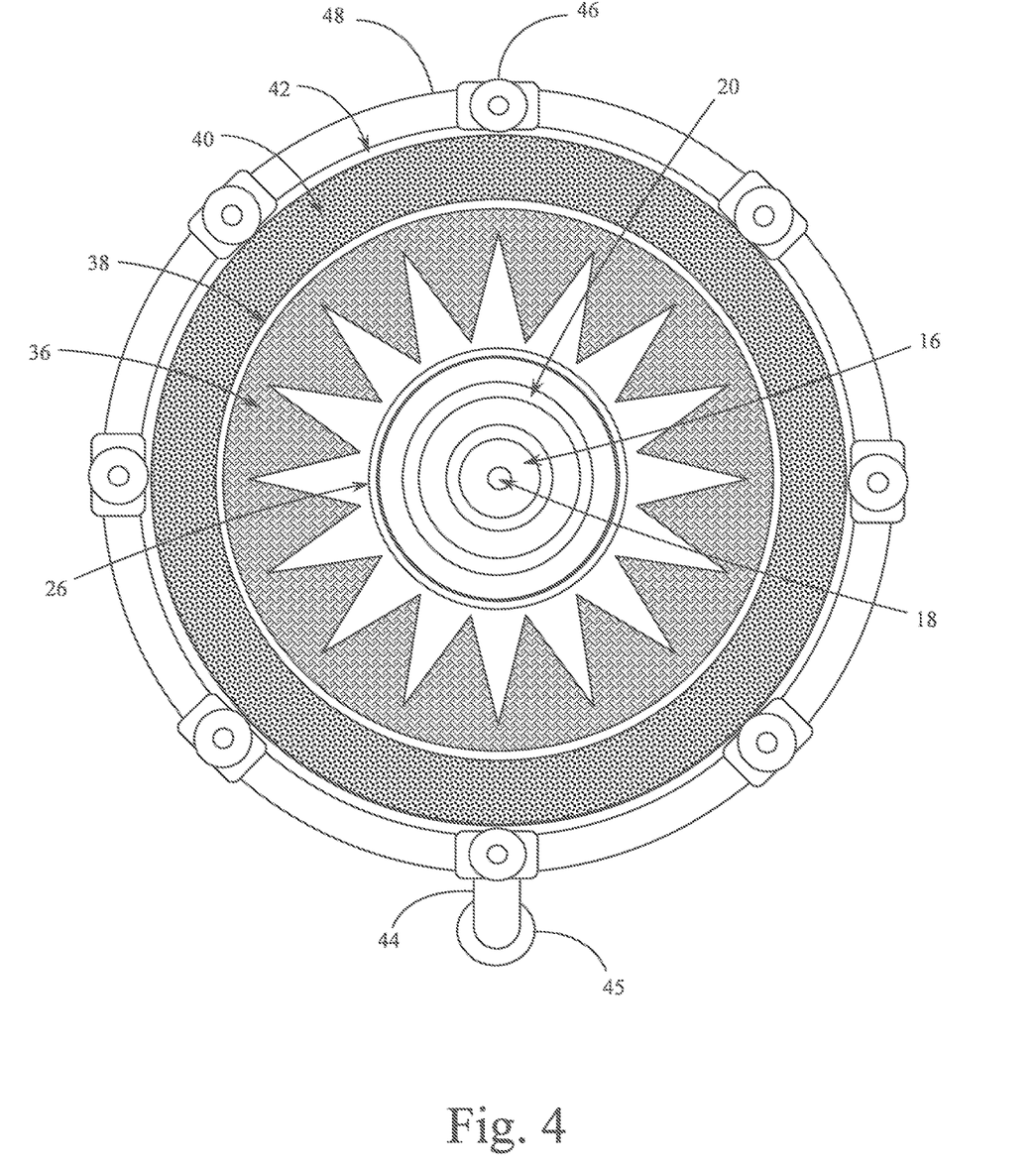
FIG. 4 is a front elevational view of the preferred embodiment of the nozzle shroud and safety device of the present invention as shown in FIG. 1 with the front cover and front layered baffle removed to show the interior layers of noise reduction materials.

FIG. 4 is a front elevational view of the preferred embodiment of the nozzle shroud and safety device of the present invention as shown in FIG. 1 with the front cover and front layered baffle removed to show the interior layers of noise reduction materials. In the view of FIG. 4, blasting nozzle 16 presents its nozzle outlet port 18 in the axial center of metal mesh blast column 26 which is the forward extension of shroud nozzle attachment collar 20.

Surrounding mesh blast column 26, but preferably spaced therefrom, is inner acoustic dampener material 36. Once again, in the preferred embodiment, inner acoustic dampener material 36 is constructed from open cell dimensional acoustic foam. This second layer of acoustic wave disruption is shaped (dimensioned) with inward directed peaks separated by air gap valleys that capture and "trap" the disrupted acoustic waves that have moved through mesh blast column 26. Other configurations for the geometry of dimensional acoustic material 36 are anticipated with the objective of the layer being to receive and attenuate the acoustic waves rather than to reflect them back.

As described above, intermediate air gap 38 separates inner acoustic dampener material 36 from the next noise reduction layer made up of outer acoustic dampener material 40. In the preferred embodiment, outer acoustic dampener material 40 is constructed from one or more layers of dense acoustic panel that provide further attenuation of the expanding acoustic waves. Outer acoustic dampener material 40 is preferably composed of a dense fibrous material of the type used for acoustic panels and the like. This outer acoustic material is confined and shaped by outer cone shell 42, which provides the final side barrier to the expanding acoustic waves generated by the abrasive blast emanating from the blast nozzle. The acoustic waves that reach the rigid surface of outer cone shell 42 are reflected back inward into the layers of acoustic dampening material or are directed forward into the layered baffle (removed in FIG. 4, but see FIG. 2) where they are further attenuated.

The ancillary air curtain system described above that is incorporated on the exterior of the shroud provides a final "barrier" to the sideways expansion of the acoustic waves emanating from the blast nozzle 16. As seen in FIG. 4, peripheral air curtain nozzles 46 are positioned to direct jets of air forward to surround the forward shroud cover (removed in FIG. 4) and the central outlet aperture to provide additional noise dampening. In the preferred embodiment of the present invention shown in FIGS. 1-4, four layers of acoustic wave disruption are provided to significantly reduce the noise typically generated with the flow of abrasive entrained high pressure air from the blast nozzle. These layers include: (a) mesh blast column 26; (b) inner acoustic dampener material 36; (c) outer acoustic dampener material 40; and (d) the ancillary air curtain system provided by peripheral air curtain nozzles 46. While the above are the primary active layers achieving the noise reduction functionality of the present invention, the air gaps described and the rigid shell components described, shaped and positioned as they are in the preferred embodiments, are not insignificant in facilitating the noise reduction.

Figure 5:
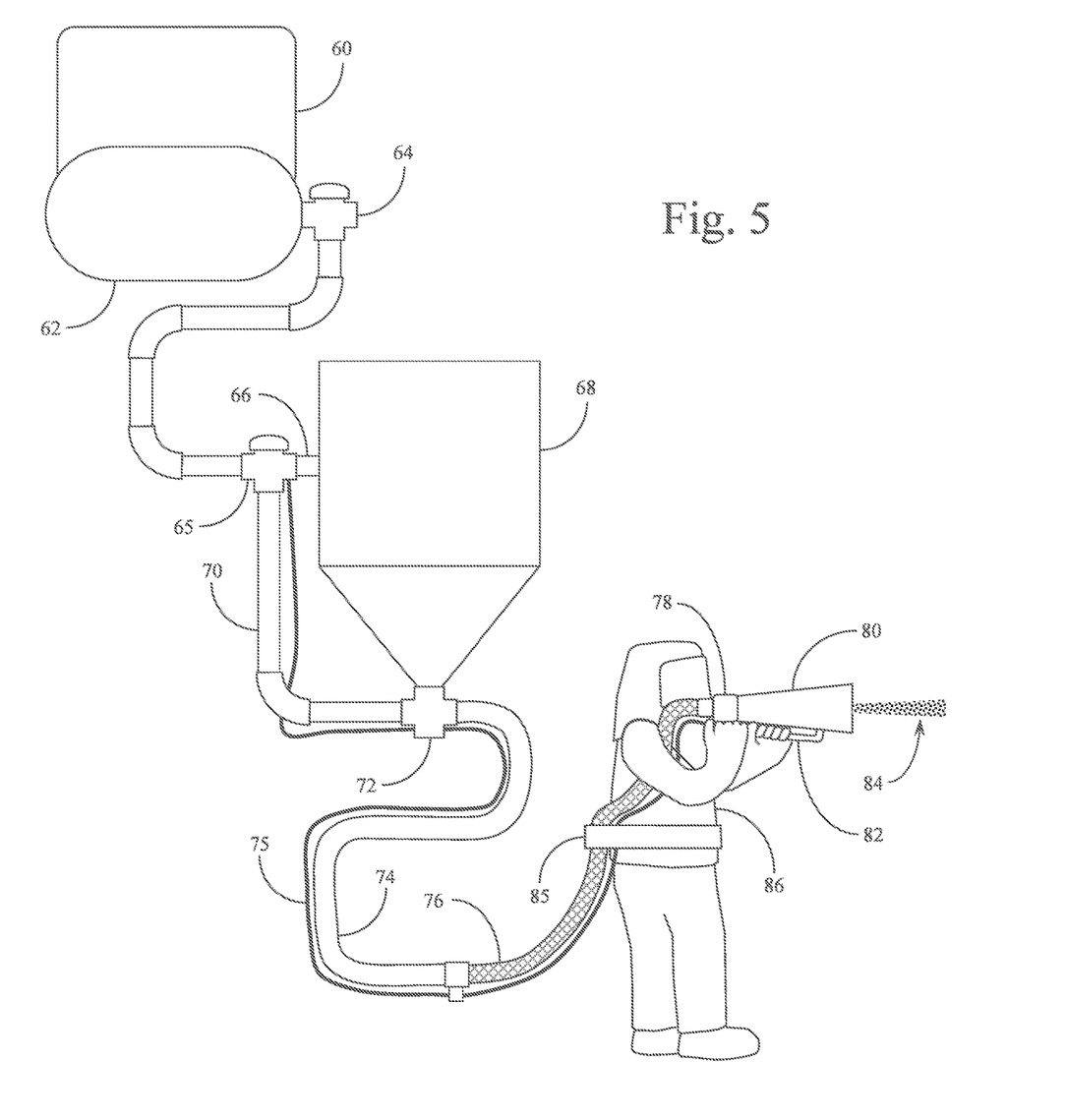
FIG. 5 is a schematic diagram showing use of the nozzle shroud and safety device of the present invention with a typical abrasive blasting system.

Reference is next made to FIG. 5 which is a schematic diagram showing use of the nozzle shroud and safety device of the present invention with a typical abrasive blasting system. As indicated above, the device of the present invention is structured to be used in connection with standard abrasive blasting systems and to require little or no modification to such systems to achieve optimal functionality. The standard abrasive blasting system shown schematically in FIG. 5 includes abrasive blasting system air compressor 60 with compressed air reservoir tank 62. It should be noted that some systems operate directly off of an air compressor without the need for a reservoir. Compressed air flow from the compressor/reservoir is regulated initially with compressed air supply valve 64.

Compressed air flow in the system is directed to the abrasive media tank 68 where the flow is split (and further regulated) at manifold valve 65. A flow of air is directed into abrasive media tank 68 through abrasive media tank compressed air inlet 66. This flow of air mixes with the reservoir of abrasive material in abrasive media tank 68 to create an air—abrasive slurry that will more readily flow out from the tank by gravity feed at the tank bottom funnel outlet.

The primary flow of compressed air is directed around abrasive media tank 68 by way of compressed air supply line 70 to abrasive metering valve 72. It should be noted that operational control of the flow of high pressure air with entrained abrasive material is achieved by way of the connection shown between the dead man switch (described above) and metering valve 72 as well as manifold valve 65.

This control is provided through electrical or pneumatic control line 75 which parallels flexible supply line 74 and high pressure supply line (whip hose) 76 from the device of the present invention.

The operator 86 (preferably wearing a protection suit as shown) holds the nozzle shroud assembly 80 of the present invention using forward grip handle 82 and rear control handle (hidden in this view) as described above. Shroud nozzle attachment collar 78 (an assembly of the components described above with FIG. 2) connects shroud assembly 80 to the blast nozzle (not seen in this view) that is secured to the end of whip hose 76. In this manner, operator 86 may direct high pressure abrasive stream 84 against the surface being worked.

Further safety elements to the overall system of the present invention are shown in FIG. 5 and include operator whip hose support belt/harness 85 in addition to the aforementioned operator protection suit. This harness 85, which is preferably removably connected to an appropriate point on whip hose 76, allows the operator to manipulate the device of the present invention without bearing the entire weight of the whip hose using his or her arms. This harness (which may be a belt or a combination of a belt and shoulder straps) provides additional safety to the operator and helps reduce fatigue.

Figure 6:
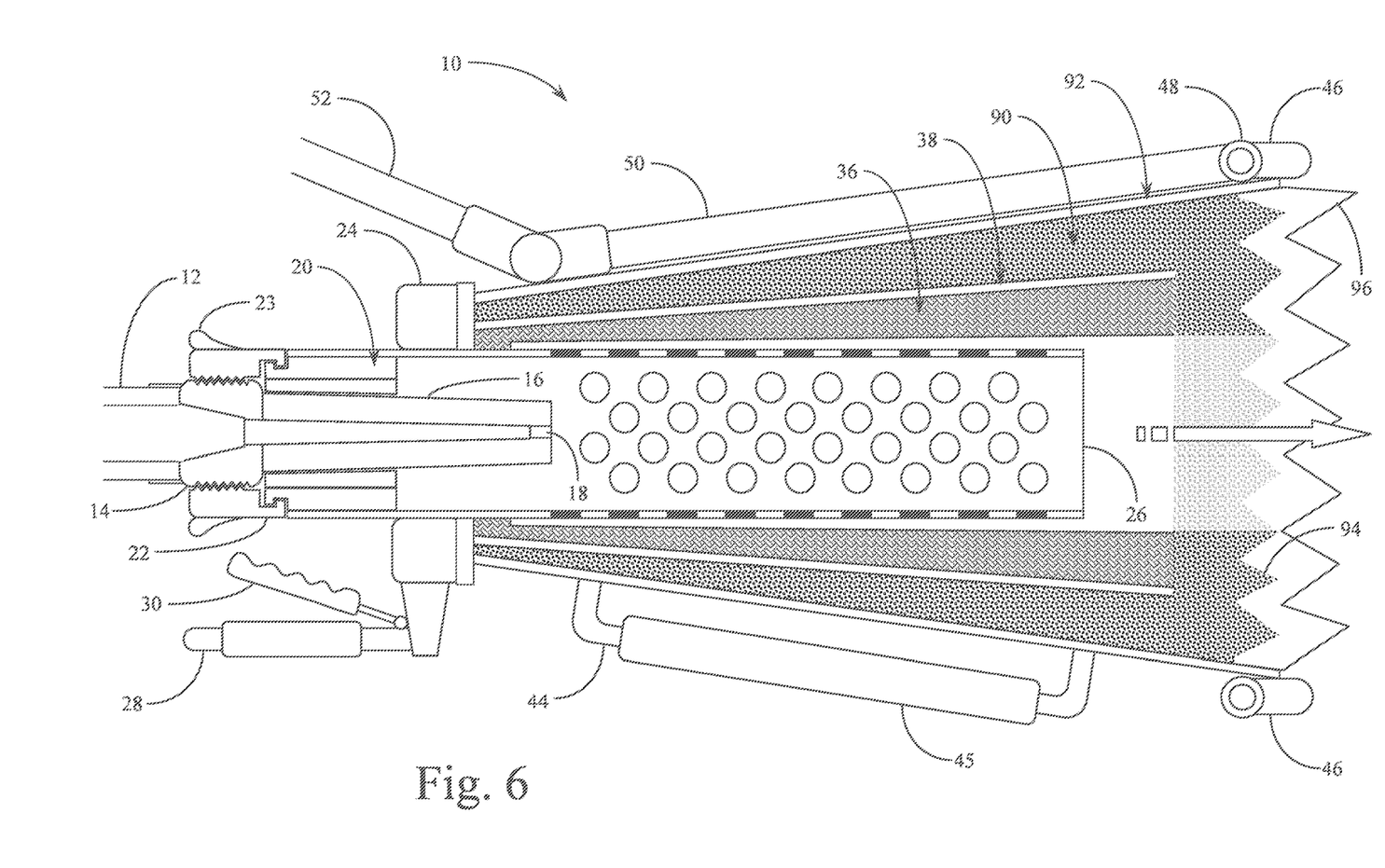
FIG. 6 is a cross-sectional view of a second preferred embodiment of the nozzle shroud and safety device of the present invention showing the interior layers of noise reduction materials and structures.

Reference is next made to FIG. 6 which is a cross-sectional view of a second preferred embodiment of the nozzle shroud and safety device of the present invention showing the interior layers of noise reduction materials and structures, in much the same manner as in FIG. 2. Most of the components of this second preferred embodiment are the same as or are similar to corresponding components shown in the first preferred embodiment. In FIG. 6, nozzle shroud assembly 10 is again shown connected to whip hose 12 through hose nozzle coupler 14 which connects to shroud nozzle attachment collar 20 by way of shroud collar hose threaded attachment 22. In this second preferred embodiment, blasting nozzle 16, which terminates nozzle coupler 14, is again secured to the shroud using threaded attachment 22 which rotates captively on attachment collar 20. Once again, shroud cone collar 24 is fixed on attachment collar 20 and supports outer cone shell 92 which forms the overall enclosure for the noise dampening structures. As in the first preferred embodiment, blasting nozzle 16 presents its nozzle outlet port 18 in the axial center of metal mesh blast column 26. Mesh blast column 26 is again the forward extension of shroud nozzle attachment collar 20 and is preferably constructed of a rigid metal cylinder perforated with an array of apertures as shown. Surrounding mesh blast column 26 is inner acoustic dampener material 36 preferably constructed from open cell dimensional acoustic foam. Intermediate air gap 38 separates inner acoustic dampener material 36 from outer acoustic dampener material 90. In this second preferred embodiment, outer acoustic dampener material 90 is again constructed from a layer of dense acoustic panel, but in this embodiment extends further forward towards the open end of the device as shown. This outer acoustic material is still generally confined and shaped by outer cone shell 92, but in the second embodiment shown, extends outward (forward) to terminate in a chevron shaped acoustic material edge 94. Outer cone shell 92 likewise extends outward (forward) to terminate in a chevron shaped cone shell edge 96. These distinct chevron shaped peripheral edges to the outer acoustic material layer and the outer cone shell have the effect of further disrupting the partially attenuated acoustic waves emanating from the device. Depending on the operational parameters of the system (the type of abrasive, the air pressure, the work surface, etc.) the partially closed end of the first preferred embodiment of the present invention may be seen to contribute to a back pressure on the system that could affect efficiency. Although this back pressure has not been seen to be significant in most abrasive blasting operations, the structures of the second preferred embodiment provide an alternative that still achieves a significant noise reduction.

Figure 7:
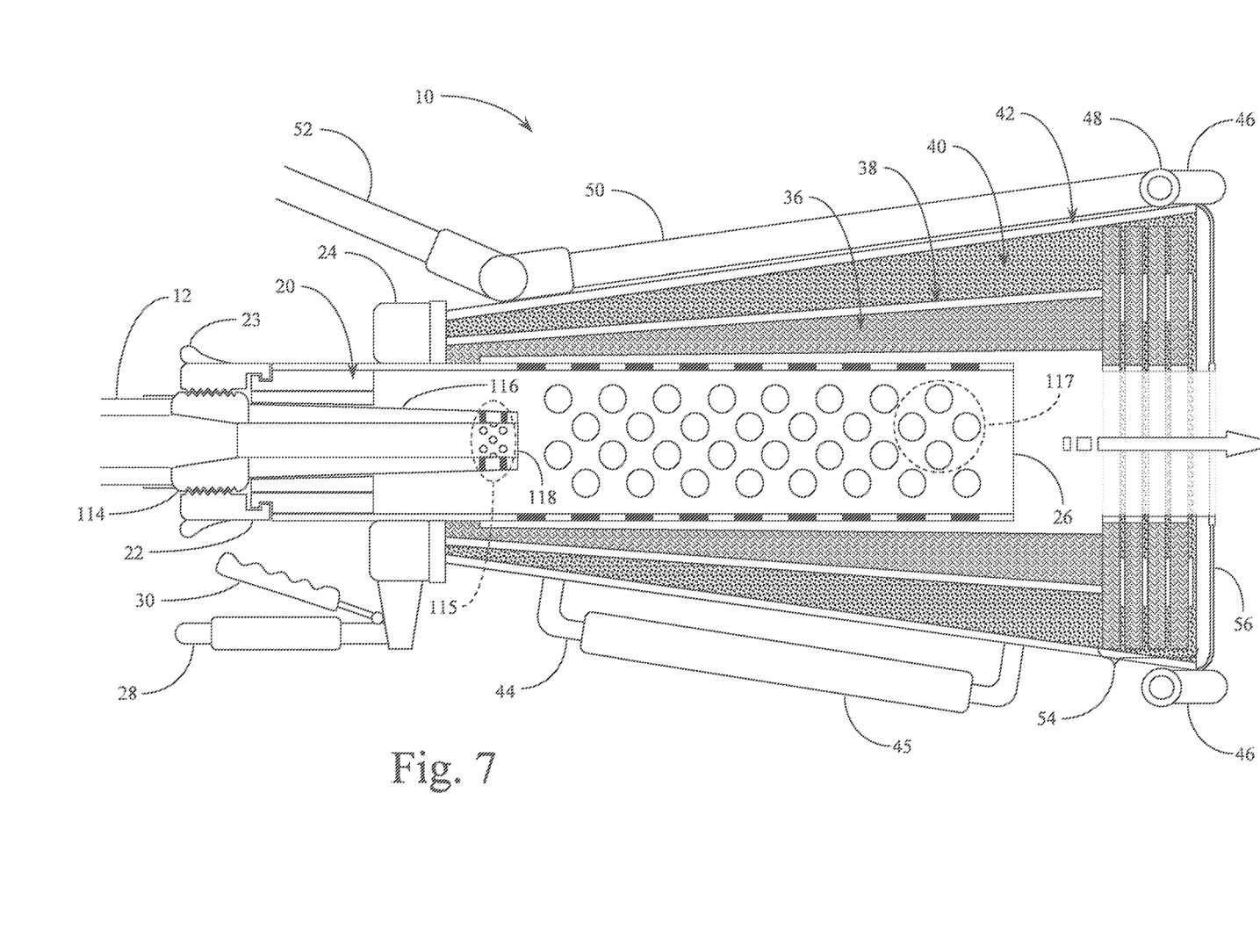
FIG. 7 is a cross-sectional view of an alternate exemplary embodiment of the nozzle shroud and safety device of the present invention, similar to that shown in FIG. 1 and taken on Section Line A-A' in FIG. 3 but with an alternate structure to the blasting nozzle to which the shroud is attached.

In FIG. 7, nozzle shroud assembly 10 is again shown connected to whip hose 12 through hose nozzle coupler 114 which connects to shroud nozzle attachment collar 20 by way of shroud collar hose threaded attachment 22. In this alternate exemplary embodiment, blasting nozzle 116, which terminates nozzle coupler 114, is secured to the shroud of the present invention using threaded attachment hand tightening fins 23 positioned on threaded attachment 22 which, as more clearly seen in FIG. 2, rotates captively on attachment collar 20. In this manner, nozzle 116 at the end of whip hose 12 is tightly secured into the receptacle collar components at the rearward end of shroud assembly 10. Once again, shroud cone collar 24 is fixed on attachment collar 20 and supports outer cone shell 42 which forms the overall enclosure for the noise dampening structures of the present invention.

Alternate blasting nozzle 116 presents its nozzle outlet port 118 in the axial center of metal mesh blast column 26. In this embodiment, the forward end section of nozzle 116 is preferably perforated with an array of nozzle wall apertures 115 as shown. These nozzle wall apertures 115 provide a pre-exit preliminary disruption of the acoustic waves coming through nozzle outlet port 118. Mesh blast column 26 is the forward extension of shroud nozzle attachment collar 20 and again is preferably constructed of a rigid metal cylinder perforated with its own array of blast column wall apertures 117 as shown (referencing the entire army of blast column wall apertures by referencing a subset in FIG. 7). This combination of nozzle wall apertures 115 and blast column wall apertures 117 together provide an even more significant initial disruption of the acoustic waves coming through and from nozzle outlet port 118.

It should be noted that the multiple levels or layers of noise reduction elements in the above described preferred embodiments may be applied together or in groups to provide an optimized noise reduction shroud and nozzle safety assembly. For example, the chevron shaped edges described in the second preferred embodiment may be used with the baffle and front end cap structures of the first preferred embodiments. The air curtain system described and shown with each of the preferred embodiments may or may not be utilized depending on the availability of the ancillary air flow and/or the requirements for a specific surface being worked.

The device of the present invention may also be constructed so as to be capable of replacing or renewing the acoustic material components after a period of use. While the abrasive particles entrained in the blasting air stream generally exit the device, turbulent flow around the nozzle will inevitably result in particulates becoming trapped in the acoustic material which will, over time, reduce its ability to absorb and attenuate acoustic waves. Mechanisms for separating and replacing the shroud cone components from the rigid (typically metal) hose connection coupling components are anticipated.

Apart from the acoustic materials whose preferred compositions have been generally described above, the rigid components of the shroud may be made from metal (preferably light weight) or from rigid composites that can hold up under the high forces and rough handling typically associated with abrasive blasting systems and operation. Because the mesh blast column described with each embodiment is the first acoustic dampening layer to encounter the abrasive air flow, albeit indirectly, it is preferred that this component be made from a strong metal such as steel. The relatively thin wall of the structure and the array of perforations in that cylindrical wall generally offset the weight associated with the denser metal. The outer cone shell, on the other hand, lends itself to weight reduction by being made of a lighter weight composite material even though a thin walled metal cone enclosure could provide a more durable enclosure without being overly heavy for the operator to handle. In the end, operator fatigue with abrasive blasting using the device of the present invention will primarily come from the very strong forces associated with the blast stream itself rather than the weight of the device of the present invention. The typical backwards force exerted on one hand (prior art blasting methods typically involve manipulating the nozzle with one hand while the other hand secures and manipulates the whip hose) for a blasting nozzle without the shroud of the present invention can average twenty to twenty-one pounds. With the shroud in place, such forces can average eleven to twelve pounds which, when distributed between the two hands holding the shrouded nozzle of the present invention, can be in the range of five and a half to six pounds of force on each hand. In other words, there is evidence to show that use of the device of the present invention actually reduces operator fatigue rather than increasing it.

It will be apparent that the safety aspects of the present invention are in part provided by extending the shroud forward of the nozzle such that inadvertent placement of a hand, arm, leg or other part of the body of the operator in front of the nozzle is made less likely. The preferred two handed operation of the device also improves safety by providing much greater control of the direction of the abrasive blast stream as well as reduction in vibration. Although not itself a novel feature, the dead man switch incorporated into the rear handle further improves the safe operation of the device. In particular, however, it is the noise reduction (for both the operator and those nearby) that provides improved safety by reducing the likelihood of short term or long term hearing loss that has become ubiquitous of abrasive blasting operations, even with ancillary ear protection in place.

Although the present invention has been described in terms of the foregoing preferred embodiments, this description has been provided by way of explanation only, and is not intended to be construed as a limitation of the invention. Those skilled in the art will recognize modifications of the present invention that might accommodate specific abrasive blasting systems and specific surfaces to be worked. Those skilled in the art will further recognize additional methods for modifying the geometry and size of the components of the system to facilitate optimal use of particular abrasives and/or operational air pressures. Such modifications, as to structure, orientation, geometry, and even composition and construction techniques, where such modifications are coincidental to the type of abrasive blasting system being utilized, do not necessarily depart from the spirit and scope of the invention.

I claim:

1. An abrasive blasting nozzle and shroud assembly for reducing the noise generated by an abrasive blasting system during operation, the nozzle and shroud assembly comprising:

an abrasive blasting system nozzle coupled to a blasting material supply hose, the nozzle comprising side walls and an outlet port, the side walls having an array of perforations proximal to the outlet port, the perforations generally orthogonal to a longitudinal axis of the nozzle; and
a nozzle shroud, the shroud comprising:
an attachment collar, removably securing the nozzle shroud to the abrasive blasting system nozzle;
a cylindrical blast column connected to the attachment collar and positioned forward from and coaxial with the blasting system nozzle, the cylindrical blast column having an open coaxial outlet end allowing a linear flow of the abrasive stream therethrough; and
a conical shell connected to the attachment collar, surrounding and coaxial with the cylindrical blast column, the conical shell comprising at least one layer of shell acoustic dampening material, the conical shell having an at least partially open outlet end coaxial with the open outlet end of the cylindrical blast column, allowing a linear flow of the abrasive stream therethrough;
wherein the combination of the cylindrical blast column and conical shell form a cone shaped shroud, closed on an inlet end by the blasting system nozzle and open on an outlet end to be directed towards the surface to be subjected to abrasive blasting.

2. The nozzle and shroud assembly of claim 1 wherein the cylindrical blast column comprises a rigid cylindrical wall, the cylindrical wall defining an array of apertures perpendicular to an axis of the cylindrical wall.

3. The nozzle and shroud assembly of claim 1 further comprising a partially open end cover connected to the conical shell, the partially open end cover comprising an annulus with an outer perimeter connected to the conical shell and an inner aperture coaxial with the outlet end of the cylindrical blast column.

4. The nozzle and shroud assembly of claim 3 wherein a diameter of the inner aperture of the end cover is approximately the same as a diameter of the outlet end of the cylindrical blast column.

5. The nozzle and shroud assembly of claim 1 wherein the at least one layer of shell acoustic dampening material comprises a plurality of layers of acoustic dampening material, each layer separated from one another by an air gap.

6. The nozzle and shroud assembly of claim 3 wherein the partially open end cover further comprises at least one layer of end cover acoustic dampening material.

7. The nozzle and shroud assembly of claim 3 wherein the at least one layer of end cover acoustic dampening material comprises a plurality of layers of acoustic dampening material, each layer separated from one another by an air gap, each layer further comprising an annulus with an inner aperture coaxial with the outlet end of the cylindrical blast column.

8. The nozzle and shroud assembly of claim 1 further comprising an air curtain system for establishing a cylindrically shaped air curtain around the open end of the nozzle shroud, the air curtain system comprising a circular array of nozzles positioned on a periphery of the outlet end of the nozzle shroud, the circular array of nozzles connected by air flow conduits to a pressurized air source.

9. The nozzle and shroud assembly of claim 5 wherein the plurality of layers of shell acoustic dampening material comprises a first layer of open cell dimensional acoustic foam material, the first layer surrounding and adjacent the cylindrical blast column, and at least one further layer comprising dense acoustic panel material, the at least one further layer surrounding the first layer.

10. The nozzle and shroud assembly of claim 1 wherein the outlet end of the nozzle shroud comprises a circular perimeter edge of the conical shell surrounding a circular perimeter edge of the at least one layer of acoustic dampening material, the circular perimeter edges of each of the conical shell and the at least one layer of acoustic dampening material formed into non-overlapping chevron shapes.

* * * * *